(12) United States Patent
Hira et al.

(10) Patent No.: US 10,848,461 B2
(45) Date of Patent: Nov. 24, 2020

(54) UNIFIED SECURITY POLICIES ACROSS VIRTUAL PRIVATE CLOUDS WITH OVERLAPPING IP ADDRESS BLOCKS

(71) Applicant: Nicira, Inc., Palo Alto, CA (US)

(72) Inventors: Mukesh Hira, Palo Alto, CA (US); Jayant Jain, Palo Alto, CA (US); Ganesan Chandrashekhar, Campbell, CA (US); Anirban Sengupta, Palo Alto, CA (US); Pankaj Thakkar, Santa Clara, CA (US); Alexander Tessmer, San Jose, CA (US); Vivek Agarwal, Campbell, CA (US)

(73) Assignee: Nicira, Inc., Palo Alto, CA (US)

( * ) Notice: Subject to any disclaimer, the term of this patent is extended or adjusted under 35 U.S.C. 154(b) by 345 days.

(21) Appl. No.: 15/881,703

(22) Filed: Jan. 26, 2018

(65) Prior Publication Data
US 2019/0238508 A1  Aug. 1, 2019

(51) Int. Cl.
*H04L 29/06* (2006.01)
*G06F 21/53* (2013.01)
(Continued)

(52) U.S. Cl.
CPC ...... *H04L 63/0263* (2013.01); *G06F 9/45558* (2013.01); *G06F 21/53* (2013.01); *H04L 41/0893* (2013.01); *H04L 61/2007* (2013.01); *H04L 61/2061* (2013.01); *H04L 63/0236* (2013.01); *H04L 63/0272* (2013.01); *H04L 63/0281* (2013.01); *H04L 63/20* (2013.01);
(Continued)

(58) Field of Classification Search
CPC ..... H04L 41/08; H04L 41/0893; H04L 63/00; H04L 63/02; H04L 63/0227; H04L 63/0236; H04L 63/0272; H04L 63/20
See application file for complete search history.

(56) References Cited

U.S. PATENT DOCUMENTS 10,484,334 B1 * 11/2019 Lee .................. H04L 63/0245
2013/0058250 A1 * 3/2013 Casado ............... H04L 49/70
370/254

(Continued)

FOREIGN PATENT DOCUMENTS

WO  2015/071888 A1   5/2015
WO  2015/173759 A1   11/2015

OTHER PUBLICATIONS

"Firewall (computing)". Wikipedia. Retrieved on Mar. 27, 2019. 9 pages.

(Continued)

*Primary Examiner* — Khang Do

(74) *Attorney, Agent, or Firm* — Patterson + Sheridan LLP

(57) ABSTRACT

The present disclosure generally relates to applying global unified security policies across a plurality of virtual private clouds of a logical network. The logical network is deployed on a software-defined datacenter that constitute one or more private and/or public datacenters. The plurality of virtual private clouds of the logical network may have one or more overlapping internet protocol address blocks, with each virtual private cloud deploying one or more virtual machines and/or containers. A global unified security policy is disseminated to endpoints throughout the logical network using logical ports of the virtual machines and/or containers.

22 Claims, 5 Drawing Sheets

(51) Int. Cl.
*G06F 9/455* (2018.01)
*H04L 12/24* (2006.01)
*H04L 29/12* (2006.01)

(52) U.S. Cl.
CPC .. *G06F 2009/45595* (2013.01); *H04L 63/164* (2013.01); *H04L 2212/00* (2013.01)

(56) References Cited

U.S. PATENT DOCUMENTS

| | | | | |
|---|---|---|---|---|
| 2013/0060929 A1* | 3/2013 | Koponen | | H04L 45/586 |
| | | | | 709/224 |
| 2014/0052877 A1* | 2/2014 | Mao | | H04L 61/103 |
| | | | | 709/245 |
| 2014/0056298 A1* | 2/2014 | Vobbilisetty | | H04L 49/65 |
| | | | | 370/355 |
| 2014/0245423 A1 | 8/2014 | Lee | | |
| 2015/0016286 A1* | 1/2015 | Ganichev | | H04L 45/586 |
| | | | | 370/252 |
| 2015/0016469 A1* | 1/2015 | Ganichev | | H04L 49/90 |
| | | | | 370/429 |
| 2015/0124631 A1* | 5/2015 | Edsall | | H04L 43/026 |
| | | | | 370/252 |
| 2015/0271011 A1* | 9/2015 | Neginhal | | H04L 45/64 |
| | | | | 370/254 |
| 2015/0271303 A1* | 9/2015 | Neginhal | | H04L 49/70 |
| | | | | 370/392 |
| 2016/0226754 A1* | 8/2016 | Zhang | | H04L 41/0654 |
| 2016/0259586 A1* | 9/2016 | Tylik | | G06F 3/0631 |
| 2016/0294933 A1* | 10/2016 | Hong | | H04L 47/125 |
| 2016/0380833 A1* | 12/2016 | Zhu | | H04L 12/4633 |
| | | | | 709/223 |
| 2017/0317972 A1 | 11/2017 | Bansal et al. | | |
| 2018/0115470 A1* | 4/2018 | Huang | | H04L 43/026 |
| 2018/0234459 A1* | 8/2018 | Kung | | H04L 63/20 |

OTHER PUBLICATIONS

International Search Report dated Apr. 8, 2019 for International Application No. PCT/US2019/015266, filed Jan. 25, 2019.

* cited by examiner

| ROW | VIRTUAL MACHINE | IP ADDRESS | WORKLOAD | VIRTUAL PRIVATE CLOUD |
|---|---|---|---|---|
| 310 | VM 150 | 10.0.0.10 | Web Server | VPC 130 |
| 320 | VM 151 | 10.0.0.20 | Database Server | VPC 130 |
| 330 | VM 152 | 10.0.0.30 | Application Server | VPC 130 |
| 340 | VM 153 | 10.0.0.10 | Web server | VPC 131 |
| 350 | VM 154 | 10.0.0.20 | Application Server | VPC 131 |
| 360 | VM 155 | 10.0.0.30 | Database Server | VPC 131 |

*FIG. 3*

UNIFIED SECURITY POLICIES ACROSS VIRTUAL PRIVATE CLOUDS WITH OVERLAPPING IP ADDRESS BLOCKS

CROSS-REFERENCE TO RELATED APPLICATIONS

This application relates to: U.S. Provisional Application No. 62/380,411, entitled "EXTENSION OF NETWORK CONTROL SYSTEM INTO PUBLIC CLOUD," filed Aug. 27, 2016; U.S. application Ser. No. 15/253,829, entitled "EXTENSION OF NETWORK CONTROL SYSTEM INTO PUBLIC CLOUD," filed Aug. 31, 2016; U.S. application Ser. No. 15/253,832, entitled "MANAGED FORWARDING ELEMENT EXECUTING IN PUBLIC CLOUD DATA COMPUTE NODE WITHOUT OVERLAY NETWORK," filed Aug. 31, 2016; U.S. application Ser. No. 15/253,833, entitled "MANAGED FORWARDING ELEMENT EXECUTING IN PUBLIC CLOUD DATA COMPUTE NODE WITH DIFFERENT INTERNAL AND EXTERNAL NETWORK ADDRESSES," filed Aug. 31, 2016; U.S. application Ser. No. 15/253,834, entitled "MANAGED FORWARDING ELEMENT EXECUTING IN SEPARATE NAMESPACE OF PUBLIC CLOUD DATA COMPUTE NODE THAN WORKLOAD APPLICATION," filed Aug. 31, 2016; U.S. application Ser. No. 15/279,382, entitled "CENTRALIZED PROCESSING OF NORTH-SOUTH TRAFFIC FOR LOGICAL NETWORK IN PUBLIC CLOUD," filed Sep. 28, 2016; U.S. application Ser. No. 15/279,394, entitled "DISTRIBUTED NETWORK ENCRYPTION FOR LOGICAL NETWORK IMPLEMENTED IN PUBLIC CLOUD," filed Sep. 28, 2016; U.S. application Ser. No. 15/279,403, entitled "LOGICAL NETWORK DOMAINS STRETCHED BETWEEN PUBLIC AND PRIVATE DATACENTERS," filed Sep. 28, 2016; U.S. application Ser. No. 15/279,409, entitled "DISTRIBUTED PROCESSING OF NORTH-SOUTH TRAFFIC FOR LOGICAL NETWORK IN PUBLIC CLOUD," filed Sep. 28, 2016; U.S. application Ser. No. 15/369,580, entitled "POLICY DEFINITION AND ENFORCEMENT FOR A NETWORK VIRTUALIZATION PLATFORM," filed Dec. 5, 2016; U.S. application Ser. No. 15/369,596, entitled "MULTI-LAYER POLICY DEFINITION AND ENFORCEMENT FRAMEWORK FOR NETWORK VIRTUALIZATION," filed Dec. 5, 2016, issued as U.S. Pat. No. 9,762,619; and U.S. application Ser. No. 15/406,249, entitled "MANAGING NETWORK TRAFFIC IN VIRTUAL SWITCHES BASED ON LOGICAL PORT IDENTIFIERS," filed Jan. 13, 2017. The contents of each of these applications are hereby incorporated by reference in their entireties.

FIELD

The present disclosure relates generally to logical networks, and more specifically to distributing unified security policies through a logical network operating on a software-defined datacenter using logical ports.

BACKGROUND

An increasing number of users (e.g., organizations, companies) are moving their networks to the cloud, which is built on datacenters. The network may encompass a private datacenter and a public datacenter, or a combination of several private and/or public datacenters. A software-defined datacenter enables an administrator of the network to more easily manage the network running on several datacenters by providing a logical overlay network, which may also referred to simply as a "logical network," and which are also known in the industry as a software defined network (SDN). Logical overlay networks are decoupled from the underlying physical infrastructure using a tunneling protocol such as VXLAN or Geneve, and can be extended across multiple datacenters.

As with any network, administrators may wish to enforce a global security policy to a logical network. Security policies are typically enforced by a network using interne protocol (IP) addresses of the virtual machines. However, difficulties in applying a unified security policy uniformly to all endpoints of the logical network may arise if different virtual machines of the network are assigned overlapping IP addresses. For example, if a public datacenter of the software-defined datacenter assigns two isolated sets of computing resources over which the administrator has control, but they are deployed with overlapping IP addresses, a single unified security policy cannot be properly enforced on both sets of computing resources using traditional techniques.

OVERVIEW

The invention disclosed herein enhances the enforcement of unified security policies on a logical network running on a software-defined datacenter by implementing the policies using logical ports.

In some embodiments, a method for enforcing, on a logical network running on a software-defined datacenter, a unified global policy having rules for two or more isolated computing systems is described. The method comprises, at a central controller: transmitting, to first and second computing systems (e.g., in a public datacenter), the rules of the unified global policy, wherein each computing system includes virtual machines assigned to a particular internet protocol address block. The method further comprises, at a first virtual machine of the first computing system: receiving the plurality of rules of the unified global policy; identifying a packet to be transmitted from the first virtual machine to a destination virtual machine; identifying a source logical port corresponding to the first virtual machine and a destination logical port corresponding to the destination virtual machine; in accordance with a determination, based on the source logical port and the destination logical port, that the packet is prohibited one of the rules from being transmitted from the first virtual machine to the destination virtual machine, forgoing transmitting the packet; and in accordance with a determination, based on the source logical port and the destination logical port, that the packet is not prohibited by the rules from being transmitted from the first virtual machine to the destination virtual machine, transmitting a communication using the destination logical port, wherein the communication includes the packet.

In some embodiments, one or more non-transitory (and/or transitory) computer-readable storage medium (which optionally includes one or more modules, programs, and/or set of instructions for performing multiple functions) storing one or more programs configured to be executed by one or more processors to enforce, on a logical network running on a software-defined datacenter, a unified global policy having rules for two or more isolated computing systems is described. The one or more programs include instructions for, at a central controller, transmitting, to first and second computing systems, the rules of the unified global policy. The first and second computing system each includes virtual machines that are assigned to a particular internet protocol address block. The one or more programs further include instructions for carrying out the method at a first virtual machine, as described above.

In some embodiments, a system (which optionally includes memory and one or more modules, programs, and/or set of instructions in the memory for performing multiple functions) for enforcing, on a logical network running on a software-defined datacenter, a unified global policy having a plurality of rules to two or more isolated computing systems is described.

BRIEF DESCRIPTION OF THE DRAWINGS

The following description and associated figures teach the best mode of the inventions. Thus, those skilled in the art will appreciate variations from the best mode that fall within the scope of the inventions. Those skilled in the art will appreciate that the features described below can be combined in various ways to form multiple variations of the inventions. As a result, the inventions are not limited to the specific examples described below, but only by the claims and their equivalents.

FIG. 3 illustrates a table showing the assigned IP addresses and workloads of virtual machines of the exemplary logical network.

DETAILED DESCRIPTION

The invention disclosed herein is directed to embodiments for enforcing unified security policies (e.g., a firewall rule, a forwarding rule) at endpoints of a logical network using logical ports. The logical network, which optionally comprises logical switches and routers to connect the network's virtual machines and/or containers, may operate on a software-defined datacenter. The logical network is further managed by a central management and control system, which in turn is optionally configured by a network administrator of an owner (e.g., an organization, a company) of the logical network.

In some embodiments, the software-defined datacenter spans across one or more private datacenters, in which the central management and control system can directly access and control the forwarding elements, and/or one or more public cloud multi-tenant datacenters, in which the central management and control system does not have direct access and control over the forwarding elements. Further, the one or more public cloud datacenters may be of the same cloud service provider or of different cloud service providers.

A typical datacenter (whether public or private) includes a plurality of host computing systems that are each powered by one or more processors and that each includes memory. Memory may include one or more computer-readable storage media. The one or more computer-readable storage media may be tangible and non-transitory, and/or may be transitory. Memory may include high-speed random access memory and may also include non-volatile memory (e.g., one or more flash storage devices, one or more magnetic disk storage devices, and/or other non-volatile solid-state memory devices). The one or more computer-readable storage media included in memory may store one or more programs comprising instructions. The instructions may be configured to implement (at least a portion of) a logical network.

In some embodiments, the logical network provides connectivity between workloads (e.g., of virtual machines, of containers) that exist on the same host computing system running on a (public or private) datacenter or that operates on separate host computing systems running across one or more (public and/or private) datacenters.

In some embodiments, the central management and control system expands private datacenter management and control into the public datacenter(s), thereby expanding management and control to the entire logical network spanning the software-defined datacenter. For example, the central management and control system directs network controllers and forwarding elements associated with the logical network to enforce security policies (e.g., firewall rules, forwarding rules) for packets sent to and from a virtual machine and/or containers. In some embodiments, public datacenter(s) provides tenants with one or more isolated sets of computing resources over which the tenant has control, which is referred to herein as virtual private clouds.

Figure 1:
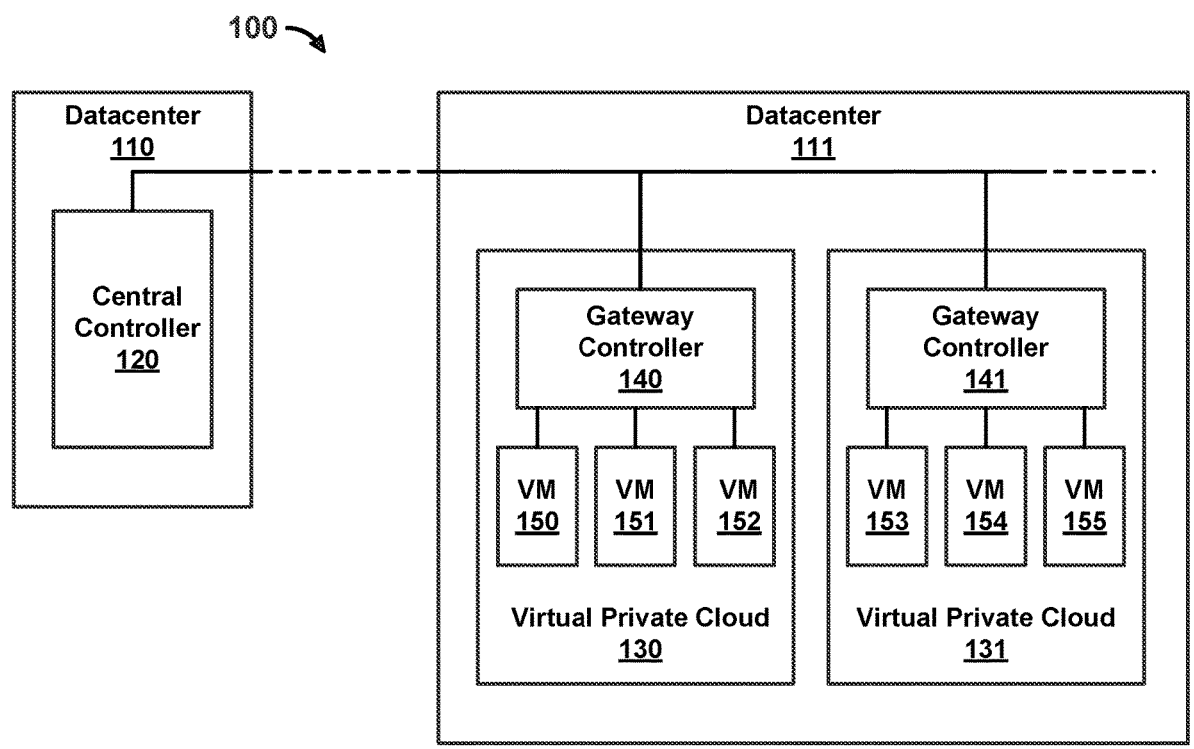
FIG. 1 illustrates a block diagram showing an exemplary logical network running on a software-defined datacenter.

FIG. 1 illustrates an exemplary logical network 100 operating on a software-defined datacenter and managed by a central management and control system. In this embodiment, the software-defined datacenter hosting logical network 100 includes a datacenter 110 and a datacenter 111. Datacenter 110 is a private datacenter operating central management and control system 120. In other embodiments, datacenter 110 may be a public datacenter. Datacenter 111 is a public datacenter hosting a plurality of compute virtual private clouds of the logical network, including virtual private cloud 130 and virtual private cloud 131. The software-defined datacenter also optionally includes one or more additional public and/or private datacenters (not shown).

In some embodiments, in order for central management and control system 120 to manage logical network 100, a first level of network controller (e.g., a gateway controller) connected to its respective virtual machines is deployed on each virtual private cloud. Virtual private cloud 130 includes a local gateway controller 140 and virtual private cloud 131 includes a local gateway controller 141. In some embodiments, the local gateway controllers operate a gateway datapath for communication with other virtual private clouds of the logical network in the same datacenter and/or with other virtual private clouds of the logical network in a different (private and/or public) datacenter and with external networks.

As also shown in FIG. 1, logical network 100 further operates a plurality of workloads as virtual machines, including virtual machines 150-152 of virtual private cloud 130 and virtual machines 153-155 of virtual private cloud 131. Workloads are optionally also deployed on one or more containers within a virtual machine. A virtual machine of the logical network (or a container of the logical network) optionally executes one or more workload applications, such as a web server, an application server, or a database server. For example, in virtual private cloud 130, virtual machine 150 is executing a web server, virtual machine 151 is executing a database server, and virtual machine 152 is executing an application server. Similarly, in virtual private cloud 131, virtual machine 153 is executing a web server, virtual machine 154 is executing an application server, and virtual machine 155 is executing a database server.

In some embodiments, each virtual machine of the logical network includes a network interface for connection to the logical network, thereby enabling communication among the virtual machines of the network. For example, the network interface for the virtual machine optionally includes a virtual network interface. Further, within each virtual machine, a managed forwarding element is optionally inserted into a datapath between the workload application and the network interface. A local control agent that configures its respective managed forwarding element is optionally operating on each virtual machine.

Features concerning the network management and control system and its ability to manage a logical network that spans both a private and public datacenters is described in greater detail in cross-referenced applications U.S. application Ser. Nos. 15/253,829, 15/253,832, 15/253,833, 15/253,834, 15/279,382, 15/279,394, 15/279,403, and 15/279,409.

As discussed above, global security policies are also implemented on a logical network (e.g., logical network 100) running on a software-defined datacenter (e.g., including datacenters 110 and 111). Typically, security policies such as firewall rules are enforced at target endpoints (e.g., virtual machines, containers) based on internet protocol (IP) addresses.

When the logical network is deployed on a software-defined datacenter, its virtual private clouds are assigned IP address blocks. If there are a plurality of virtual private clouds on the network (e.g., a first virtual private cloud for a first division of a company and a second virtual private cloud for a second division of the company), two or more of the virtual private clouds may be assigned at least partially overlapping IP address blocks upon deployment. That is, at least one virtual machine of the first virtual private cloud and at least one virtual machine of a second virtual private cloud may be assigned the same IP address (or different containers within the same virtual private cloud may be assigned overlapping IP addresses). Further, because the IP addresses are assigned by the cloud service provider of the public datacenter, the administrator may not have direct control of how the IP addresses are assigned to the endpoints (e.g., virtual machines, containers) of the logical network.

Figure 2:
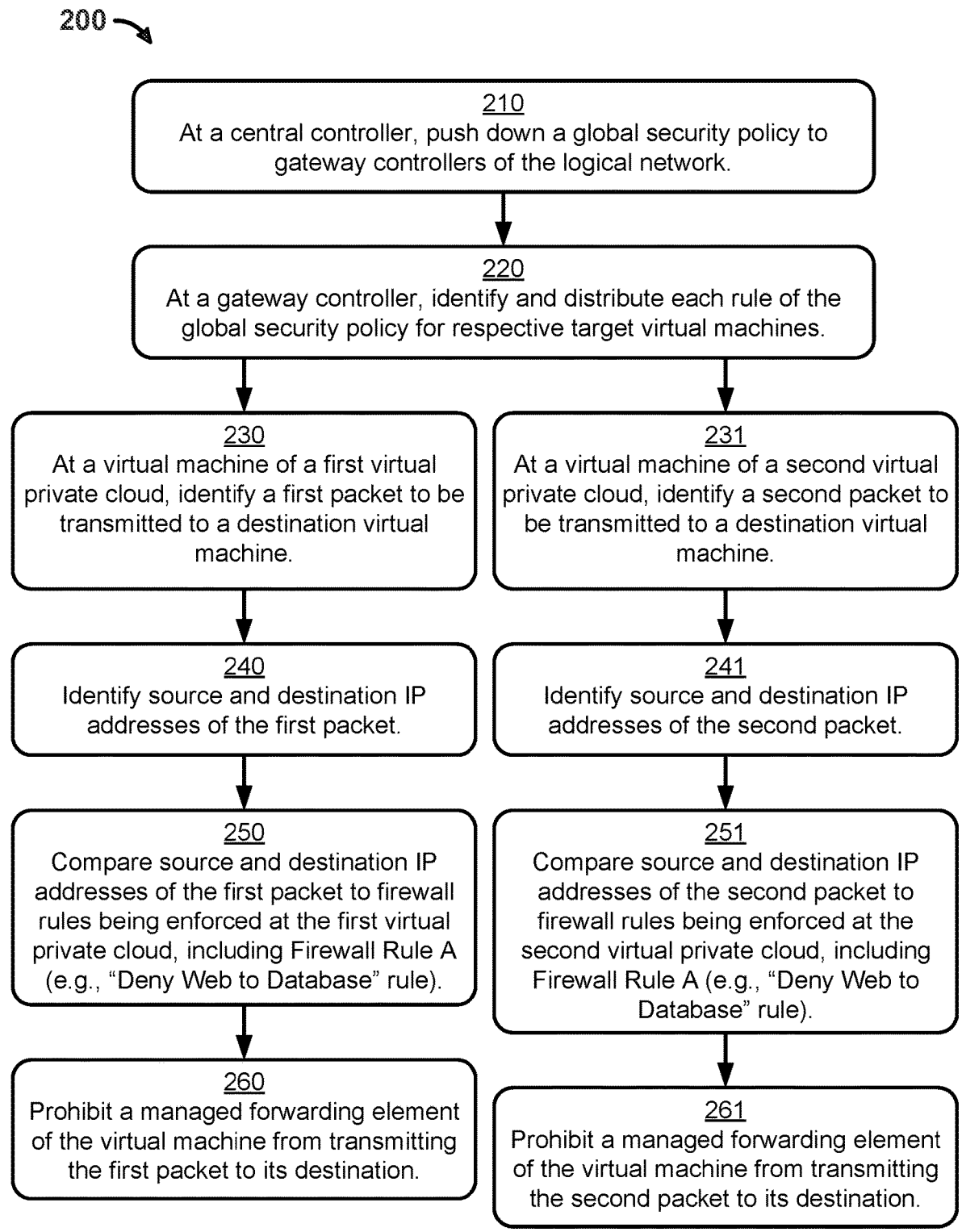
FIG. 2 illustrates a flow diagram describing an example operational scenario of enforcing a global security policy on the exemplary logical network using IP addresses.

Overlapping IP addresses among two or more virtual private clouds of a logical network may lead to inconsistent and unintended application of a security policy. This is particularly problematic when a single security policy is configured to be enforced at all (or multiple) endpoints of the network (e.g., a unified security policy) and the security policy is enforced based on IP addresses, which is a conventional method of enforcing firewall rules in a network. FIG. 2 illustrates a flow diagram 200 for enforcing a global security policy comprising a plurality of firewall rules to endpoints of logical network 100 using IP addresses. In this example, the global security policy includes a first firewall rule (referred to herein as "Firewall Rule A") that prohibits a web server workload of a virtual machine from communicating with a database server workload of a different virtual machine. Thus, in brief, Firewall Rule A is a, "Deny Web to Database" firewall rule.

In some embodiments, in order to distribute the same security policy throughout logical network 100, central controller 120 views all of the logical ports that correspond to workloads in the virtual private clouds of the logical network as being connected to a respective managed forwarding element controlled by its respective gateway controller. As such, at block 210, central controller 120 pushes down the security policy to the gateway controllers of the logical network, including gateway controllers (e.g., 140-141). Thus, the gateway controllers (e.g., 140-141) of the local network receive the same security policy information.

At block 220, upon receiving the security policy, each gateway controller (e.g., gateway controllers 140-141 of logical network 100) performs a span calculation to identify the target managed forwarding element(s) of a virtual machine(s) that require each rule of the policy and distributes each rule to its respective target managed forwarding element(s). A local control agent managing each virtual machine may then enforce the received rule(s) upon its respective managed forwarding element.

As mentioned, virtual machines are assigned IP addresses when they are deployed within a network. In some cases, different virtual private clouds may be assigned at least partially overlapping IP address blocks upon deployment. For example, FIG. 3 illustrates, in Table 300, the IP addresses and server groups assigned to each virtual machine of virtual private clouds 130 and 131. As shown in row 310, virtual machine 150 is assigned IP address 10.0.0.10 and a web server workload. As shown in row 320, virtual machine 151 is assigned IP address 10.0.0.20 and a database server workload. As shown in row 330, virtual machine 152 is assigned IP address 10.0.0.30 and an application server workload. As shown in row 340, virtual machine 153 is assigned IP address 10.0.0.10 a web server workload. As shown in row 350, virtual machine 154 is assigned IP address 10.0.0.20 and an application server workload. As shown in row 360, virtual machine 165 is assigned IP address 10.0.0.30 and a database server workload.

A firewall rule is typically enforced at the endpoints of the network based on IP address of the virtual machine. In some embodiments, Firewall Rule A is configured to operate at virtual private cloud 130 and not at virtual private cloud 131 (and thus is not a unified firewall rule that is enforced uniformly across all endpoints of the network). As noted above, Firewall Rule A prohibits a web server workload from communicating with a database server workload. When the rule is translated to IP addresses, Firewall Rule A prohibits communication between a virtual machine with IP address 10.0.0.10 and a virtual machine with IP address 10.0.0.20.

Returning to FIG. 2, at block 230, the local control agent of virtual machine 150 identifies a packet (referred to herein as "Packet A") destined for virtual machine 151 (the destination virtual machine). At block 240, upon identifying Packet A, the local control agent of virtual machine 150 further identifies source and destination IP addresses of the packet. In this example, the source and destination IP addresses of Packet A is 10.0.0.10 and 10.0.0.20, respectively.

At block 250, upon determining the source and destination IP addresses of Packet A, the local control agent of virtual machine 150 compares the IP addresses to the firewall rules being enforced at virtual private cloud 130, which includes Firewall Rule A. Under Firewall Rule A, however, a communication is prohibited between 10.0.0.10 and 10.0.0.20 IP addresses. As such, at block 260, the local control agent of virtual machine 150 blocks a managed forwarding element of virtual machine 150 from transmitting Packet A to its intended destination (virtual machine 151), thereby satisfying Firewall Rule A's enforcement rule blocking communication between a web server workload (virtual machine 150) and a database server workload (virtual machine 151).

In some embodiments, Firewall Rule A is a unified firewall rule configured to operate uniformly across all endpoints of the logical network, including at both virtual private cloud 130 and virtual private cloud 131. In this scenario, unified Firewall Rule A is enforced on virtual private cloud 130 as described in blocks 230-260 but also enforced on virtual private cloud 131 as described in blocks 231-261.

At block 231, the local control agent of virtual machine 153 identifies a packet (referred to herein as "Packet B") to be transmitted from virtual machine 153 (the source virtual machine) to virtual machine 154 (the destination virtual machine). At block 241, upon identifying Packet B, the local control agent of virtual machine 153 further identifies source and destination IP addresses of the packet. In this example, the source and destination IP addresses of Packet B are 10.0.0.10 and 10.0.0.20, respectively.

At block 251, upon determining the source and destination IP addresses of Packet B, the local control agent of virtual machine 153 compares the IP addresses to the firewall rules being enforced at virtual private cloud 131, including unified Firewall Rule A. Under unified Firewall Rule A, however, a communication is prohibited between the 10.0.0.10 and 10.0.0.20 IP addresses. As such, at block 261, the local control agent of virtual machine 153 blocks a managed forwarding element of virtual machine 153 from transmitting Packet B to virtual machine 154.

However, in contrast to the enforcement of Firewall Rule A in virtual private cloud 130, enforcement of Firewall Rule A in virtual private 131 results in the policy blocking communication between a web server workload (virtual machine 153) and a database server workload (virtual machine 154), because, in virtual private cloud 131, IP address 10.0.0.10 corresponds to a web server workload and IP address 10.0.0.20 corresponds to an application server workload. This is not the intent of Firewall Rule A, which is intended to block communication between a web server workload and a database worker, and not to block communication between a web server workload and an application workload.

Thus, flow diagram 200 illustrates the problem of applying a single unified firewall rule across all endpoints of a logical network of a software-defined datacenter based on, as a firewall rule typically is, IP addresses of virtual machines. This is particularly problematic for a logical network running on a software-defined datacenter, such as logical network 100, which may utilize one or more public datacenters to which the network administrator does not have control over the assignment of IP addresses of virtual machines. Thus, a network administrator is often forced to configure targeted firewall rules instead of a single unified firewall rule to ensure consistent application of a global security policy across its network.

The techniques disclosed herein solve this problem resulting from overlapping IP addresses between different virtual private clouds of a logical network by enforcing security rules based on logical ports (e.g., a 36-character universally unique identifier (UUID) as per the RFC 4122 format assigned to each virtual machine of the network) instead of IP addresses. In some embodiments, a logical port is a 36-character (e.g., 32 hex characters and 4 hyphens) universally unique identifier (UUID) as per the RFC 4122 format. In some embodiments, a logical port is represented as a 16 byte value in memory and in a packet.

In some embodiments, when a logical network is deployed in a software-defined datacenter, each virtual machine is assigned a unique logical port, which is used to join the virtual machine to a corresponding logical network or logical switch. As mentioned, these logical ports are unique across the logical network. Thus, unlike IP addresses, logical ports do not overlap across virtual private clouds of the logical network. Similarly, in a logical network that deploys containers, each container is assigned a unique logical port used to join the container to a corresponding logical network or logical switch.

Figure 4:
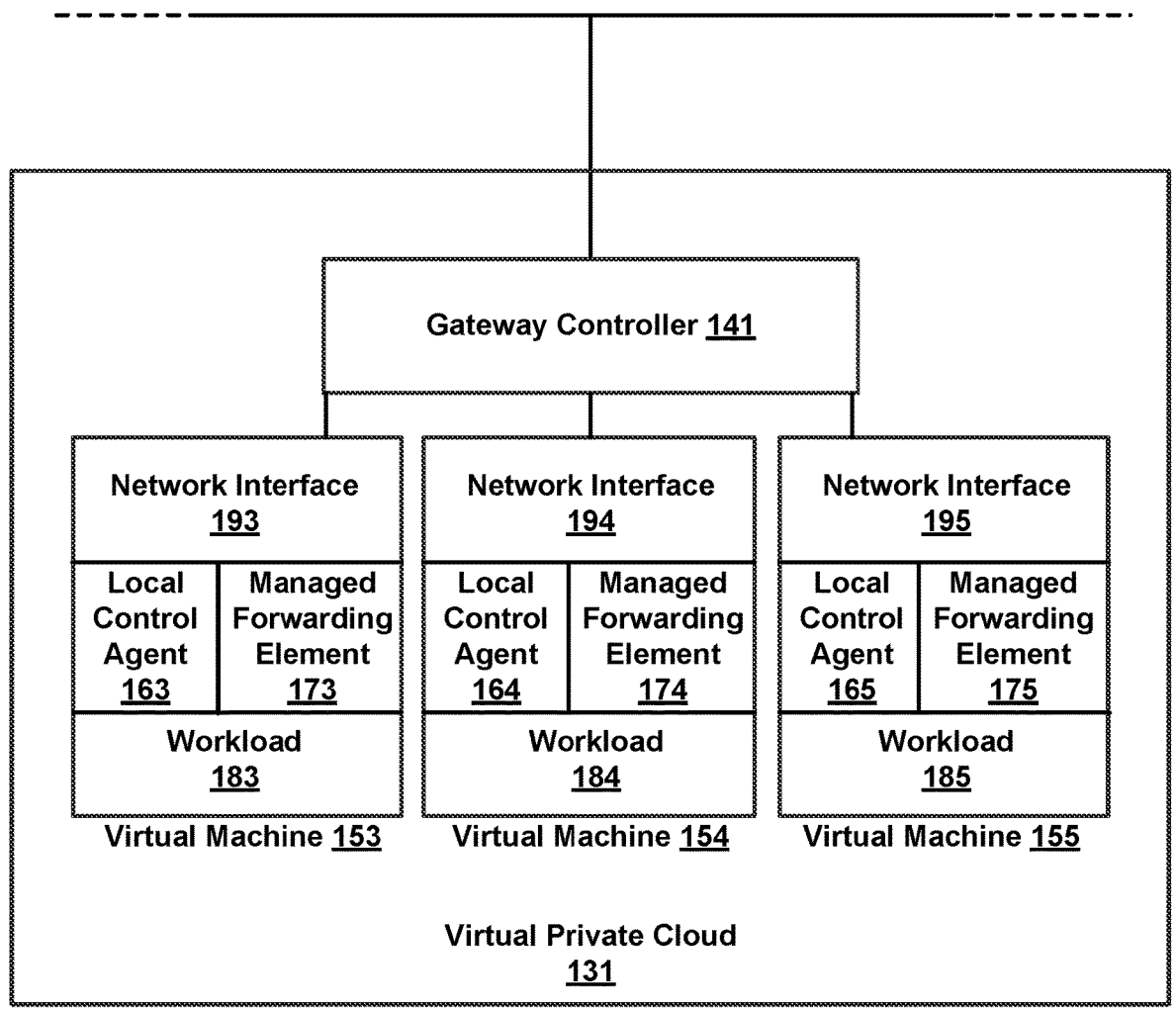
FIG. 4 illustrates a block diagram showing network components of a virtual private cloud of the exemplary logical network.
Figure 5:
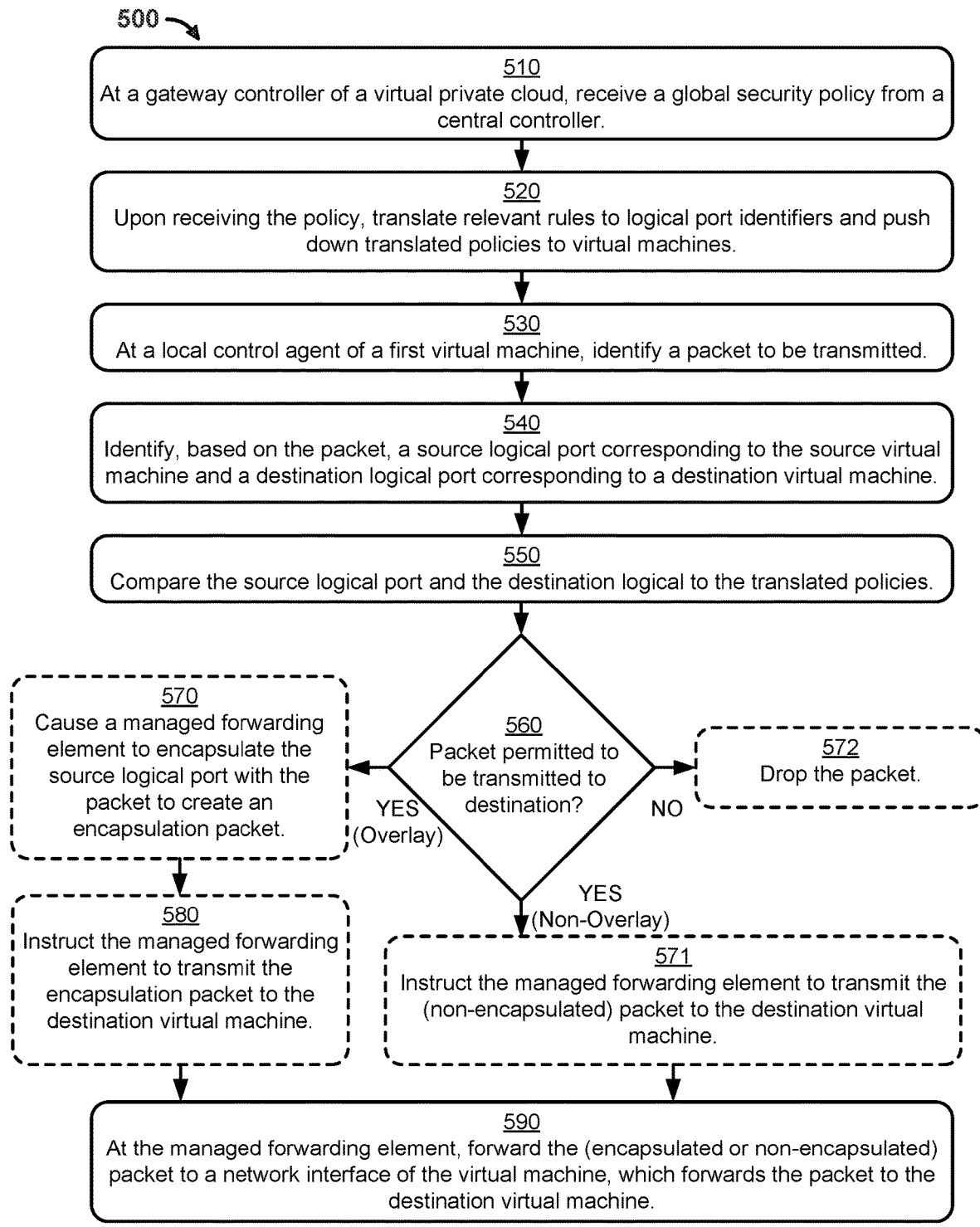
FIG. 5 illustrates a flow diagram describing an example operational scenario of enforcing a global security policy on the exemplary logical network using logical ports.

FIGS. 4-5 describe the enforcement of unified Firewall Rule A (e.g., a unified "Deny Web to Database" rule) on virtual private cloud 131 using logical ports instead of IP addresses to identify the destination virtual machine (or container). FIG. 4 illustrates an enlarged view of virtual private cloud 131 of logical network 100, in accordance with some embodiments. An example operational scenario of enforcing unified Firewall Rule A on virtual private cloud 131 is described with reference to the blocks 510-590 of Flow Diagram 500 of FIG. 5.

At block 510, gateway controller 141 of virtual private cloud 131 receives, from central controller 120, a global security policy that includes at least one unified firewall rule, including unified Firewall Rule A. At block 520, upon receiving the global security policy, gateway controller 141 translates all relevant rules (including all of the unified policies, such as unified Firewall Rule A) to logical port identifiers (instead of IP addresses), and pushes down the translated policies to each of virtual machines 153-155.

At block 530, a local control agent 163 of virtual machine 153, which manages managed forwarding element 173 (which may be a virtual switch inside the virtual machine), identifies a third packet (referred to herein as "Packet C") with the same source and destination (virtual machine 154) as Packet B. At block 540, upon identifying Packet C, local control agent 163 identifies, based on the packet, a source logical port corresponding to the source virtual machine (virtual machine 153) and a destination logical port corresponding to the destination virtual machine (virtual machine 154).

At block 550, local control agent 163 compares the identified source and destination logical ports to the firewall rules being enforced on virtual private cloud 131, which includes unified Firewall Rule A. As mentioned, the firewall rules have been translated to logical port identifiers from IP addresses. Local control agent 163 compares the source and destination logical ports of Packet C to the translated firewall rules, including unified Firewall Rule A, to determine whether Packet C is permitted, under the unified firewall rules, to be transmitted to its destination virtual machine (or destination container).

In accordance with a determination, at block 560, that the communication is permitted, local control agent 163 permits forwarding of Packet C to its destination virtual machine (or destination container). In some embodiments, if the logical network is an overlay network, the source virtual machine (or the source container) encapsulates the packet with its source logical port prior to transmitting the packet to its destination (as described below at block 570). In some embodiments, if the logical network is a non-overlay network, the source virtual machine (or the source container) transmits the packet to its destination without encapsulating the packet with its source logical port (as described below at block 571).

In accordance with a determination, at block 560, that the communication is not permitted, the source virtual machine (or the source container), at block 572, drops the packet (and thus the packet is not forwarded to its destination virtual machine or destination container).

As described with reference to blocks 210-260 and 210-261 of FIG. 2, under IP address-based enforcement, unified Firewall Rule A improperly blocked communication between virtual machine 153 (a web server) and virtual machine 154 (an application server). In contrast, if unified Firewall Rule A is enforced based on logical port identifiers, such unintended enforcement does not occur because logical port identifiers are, as opposed to IP addresses, unique across all of the virtual machines (and/or containers) of the logical network. More specifically, two virtual machines (or two containers) that share the same IP address are each assigned (e.g., upon deployment of the network) a logical port identifier that is unique in the network.

As such, while IP address-translated unified Firewall Rule A described with reference to blocks 210-261 of FIG. 2 would improperly cause local control agent 163 to prohibit managed forwarding element 173 from transmitting Packet C to virtual machine 154, local port-translated unified Firewall Rule A described with reference to blocks 510-560 causes local control agent 163 to properly allow managed forwarding element 173 to transmit Packet C to virtual machine 154. Thus, communication between virtual machine 153 and virtual machine 154 is not blocked by unified Firewall Rule A under logical port-based application of the rule. As such, if none of the other applicable firewall rules block the communication, communication of Packet C to virtual machine 154 is not blocked by the local control agent.

In some embodiments, once the source logical port is identified, the local control agent, at block 570, causes managed forwarding element 173 to encapsulate the source logical port (e.g., as a header) with Packet C into an encapsulated packet. Thus, the encapsulated packet includes Packet C with one or more headers including the source logical port of virtual machine 153 encapsulated to the packet.

In this exemplary operation, because of the distribution of the global security policy down to the workload-level, the security policies are operating right next to the workload (e.g., workloads 183-185 of virtual machines 153-155, respectively)—the security policies are enforced by the local control agent (e.g., local control agents 163-165 of virtual machines 153-155, respectively), which is on the same attachment surface as the workload. As such, if the workload is compromised, the security agent may also be comprised. In view of this potential risk, a benefit of the encapsulation is that, by encapsulating the source logical identifier to packet communications, policies can be enforced by both the sending and recipient workloads (as opposed to only by the sending workload), thereby providing a second level of security to the network.

In some embodiments, the encapsulation of the source logical port is not performed. For example, a network administrator of the logical network may not desire the overlay feature that comes with the encapsulation but may still wish for microsegmentation of the workloads. That is, another benefit of embedding the security agent directly into the virtual machines of the logical network is microsegmentation across the virtual machines—microsegmentation allows the logical network to provide each virtual machine with its own perimeter defense, thereby eliminating unauthorized access between adjacent workloads. Thus, even without encapsulation, logical network 100 still provides the benefit of microsegmentation.

At block 580, after creating the encapsulated packet of Packet C, local control agent 163 instructs managed forwarding element 173 to transmit the encapsulation packet to virtual machine 154. Similarly, at block 571, if encapsulation was not performed, local control agent 163 instructs managed forwarding element 173 to transmit Packet C to virtual machine 154.

At block 590, managed forwarding element 173 forwards the packet (non-encapsulated Packet C or the encapsulated packet including Packet C) to a network interface 193 of the virtual machine, which subsequently forwards the packet (non-encapsulated Packet C or encapsulated Packet C) to the destination virtual machine (or destination container). The use of logical ports to manage packet forwarding over virtual switches is discussed in greater detail in cross-referenced application U.S. application Ser. No. 15/406,249.

As discussed, with encapsulation, when a packet is received at a destination virtual machine (or a destination container), a policy can be re-enforced at the destination (based on the source logical port, destination logical port pair). In some embodiments, upon receiving encapsulated Packet C, the destination virtual machine (or destination container) determines (e.g., via a local control agent of the destination virtual machine), based on the encapsulated header containing the source logical port of the packet, whether Packet C is permitted under unified Firewall Rule A to be transmitted from the source virtual machine (or the source container) to the destination virtual machine (or the destination container). In accordance with a determination that Packet C is not permitted under unified Firewall Rule A to be transmitted from the source virtual machine to the destination virtual machine, Packet C is dropped by the destination virtual machine. As mentioned, this second level of enforcement at the destination virtual machine (or at the destination container) protects against the source virtual machine (or the source container) being compromised.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations.

What is claimed is:

1. A method for enforcing, on a logical network running on a software-defined datacenter, a unified global policy having a plurality of rules to two or more isolated computing systems, the method comprising:
at a central controller, transmitting, to at least a first computing system and a second computing system, the plurality of rules of the unified global policy, wherein the first computing system includes a first set of virtual machines assigned a first internet protocol (IP) address block and the second computing system includes a second set of virtual machines assigned a second IP address block, the first IP address block having an address space that at least partially overlaps an address space of the second IP address block; and
at a first virtual machine of the first computing system:
receiving the plurality of rules of the unified global policy;
identifying a packet to be transmitted from the first virtual machine to a destination virtual machine;
identifying a source logical port corresponding to the first virtual machine and a destination logical port corresponding to the destination virtual machine;
in accordance with a determination, based on the source logical port and the destination logical port, that the packet is prohibited by a first rule of the plurality of rules from being transmitted from the first virtual machine to the destination virtual machine, forgoing transmitting the packet; and in accordance with a determination, based on the source logical port and the destination logical port, that the packet is not prohibited by the plurality of rules, including the first rule, from being transmitted from the first virtual machine to the destination virtual machine, transmitting a communication using the destination logical port, wherein the communication includes the packet.

2. The method of claim 1, wherein a first virtual machine in the first set of virtual machines is assigned a first IP address and a logical port identifier, and another virtual machine in the second set of virtual machines is assigned the same first IP address, but a different logical port identifier.

3. The method of claim 1, further comprising:
translating the plurality of rules from IP addresses to logical port identifiers based on a logical topology of the logical network,
wherein the first virtual machine receiving the plurality of rules comprises receiving the translated plurality of rules.

4. The method of claim 1, further comprising:
in accordance with the determination that the packet is not prohibited by the plurality of rules, including the first rule, from being transmitted from the first virtual machine to the destination virtual machine:
prior to transmitting the communication from the first virtual machine to the destination virtual machine, encapsulating at least a source logical port identifier with the communication.

5. The method claim 1, further comprising:
in response to receiving the plurality of rules of the unified global policy, configuring a virtual switch of the first virtual machine to apply the plurality of rules of the unified global policy.

6. The method of claim 5, wherein identifying the packet to be transmitted from the first virtual machine to the destination virtual machine and identifying the source logical port corresponding to the first virtual machine and the destination logical port corresponding to the destination virtual machine is performed by a local control agent managing the virtual switch.

7. The method of claim 1, wherein the first computing system includes the destination virtual machine.

8. The method of claim 1, wherein the first computing system and the second computing system are executing on a public datacenter provided by a first cloud service provider.

9. The method of claim 1, wherein:
the first computing system is executing on a first public datacenter provided by a first cloud service provider; and
the second computing system is executing on a second public datacenter provided by a second cloud service provider different from the first cloud service provider.

10. The method of claim 1, wherein the first virtual machine receives the plurality of rules of the unified global policy from the central controller via a control plane.

11. The method of claim 10, wherein the control plane is a local control plane executing on the first computing system.

12. The method of claim 10, wherein the control plane is a central control plane of a central computing system executing on a private datacenter.

13. The method of claim 1, wherein the first virtual machine is executing a single workload of an application type.

14. The method of claim 1, wherein the first virtual machine is executing a plurality of workloads.

15. The method of claim 1, wherein the first rule is a unified firewall rule.

16. The method of claim 15, wherein the unified firewall rule is enforced uniformly across all endpoints of the logical network.

17. One or more non-transitory computer-readable storage media storing one or more programs configured to be executed by one or more processors to enforce, on a logical network running on a software-defined datacenter, a unified global policy having a plurality of rules to two or more isolated computing systems, the one or more programs including instructions for:
at a central controller, transmitting, to at least a first computing system and a second computing system, the plurality of rules of the unified global policy, wherein the first computing system includes a first set of virtual machines assigned a first internet protocol (IP) address block and the second computing system includes a second set of virtual machines assigned a second IP address block, the first IP address block having an address space that at least partially overlaps an address space of the second IP address block; and
at a first virtual machine of the first computing system:
receiving the plurality of rules of the unified global policy;
identifying a packet to be transmitted from the first virtual machine to a destination virtual machine;
identifying a source logical port corresponding to the first virtual machine and a destination logical port corresponding to the destination virtual machine;
in accordance with a determination, based on the source logical port and the destination logical port, that the packet is prohibited by a first rule of the plurality of rules from being transmitted from the first virtual machine to the destination virtual machine, forgoing transmitting the packet; and
in accordance with a determination, based on the source logical port and the destination logical port, that the packet is not prohibited by the plurality of rules, including the first rule, from being transmitted from the first virtual machine to the destination virtual machine, transmitting a communication using the destination logical port, wherein the communication includes the packet.

18. The one or more non-transitory computer-readable storage media of claim 17, wherein a virtual machine in the first set of virtual machines is assigned a first IP address and a first logical port identifier, and another virtual machine in the second set of virtual machines is assigned the same first IP address, but a different logical port identifier.

19. The one or more non-transitory computer-readable storage media of claim 17, wherein the one or more programs further include instructions for:
in accordance with the determination that the packet is not prohibited by the plurality of rules, including the first rule, from being transmitted from the first virtual machine to the destination virtual machine:
prior to transmitting the communication from the first virtual machine to the destination virtual machine, encapsulating at least a source logical port identifier with the communication.

20. A system for enforcing, on a logical network running on a software-defined datacenter, a unified global policy having a plurality of rules to two or more isolated computing systems, the system comprising:
- a central controller configured to transmit, to at least a first computing system and a second computing system, the plurality of rules of the unified global policy, wherein the first computing system includes a first set of virtual machines assigned a first internet protocol (IP) address block and the second computing system includes a second set of virtual machines assigned a second IP address block, the first IP address block having an address space that at least partially overlaps an address space of the second IP address block; and
- a first virtual machine of the first computing system, wherein the first virtual machine of the first computing system is configured to:
  - receive the plurality of rules of the unified global policy;
  - identify a packet to be transmitted from the first virtual machine to a destination virtual machine;
  - identify a source logical port corresponding to the first virtual machine and a destination logical port corresponding to the destination virtual machine;
  - in accordance with a determination, based on the source logical port and the destination logical port, that the packet is prohibited by a first rule of the plurality of rules from being transmitted from the first virtual machine to the destination virtual machine, forgo transmitting the packet; and
  - in accordance with a determination, based on the source logical port and the destination logical port, that the packet is not prohibited by the plurality of rules, including the first rule, from being transmitted from the first virtual machine to the destination virtual machine, transmit a communication using the destination logical port, wherein the communication includes the packet.

21. The system of claim 20, wherein a first virtual machine in the first set of virtual machines is assigned a first IP address and a logical port identifier, and another virtual machine in the second set of virtual machines is assigned the same first IP address, but a different logical port identifier.

22. The system of claim 20, wherein the first virtual machine of the first computing system is further configured to:
- in accordance with the determination that the packet is not prohibited by the plurality of rules, including the first rule, from being transmitted from the first virtual machine to the destination virtual machine:
- prior to transmitting the communication from the first virtual machine to the destination virtual machine, encapsulate at least a source logical port identifier with the communication.

* * * * *